US012289307B2

(12) United States Patent
Singh et al.

(10) Patent No.: US 12,289,307 B2
(45) Date of Patent: Apr. 29, 2025

(54) SYSTEM AND METHOD FOR USING A VALIDATED CARD IN A VIRTUAL ENVIRONMENT

(71) Applicant: Bank of America Corporation, Charlotte, NC (US)

(72) Inventors: Shailendra Singh, Thane West (IN); Saurabh Arora, Gurugram (IN); Sandeep Chauhan, Hyderabad (IN); Puneetha Polasa, Secunderabad (IN)

(73) Assignee: Bank of America Corporation, Charlotte, NC (US)

( * ) Notice: Subject to any disclaimer, the term of this patent is extended or adjusted under 35 U.S.C. 154(b) by 280 days.

(21) Appl. No.: 18/047,431

(22) Filed: Oct. 18, 2022

(65) Prior Publication Data

US 2024/0129302 A1   Apr. 18, 2024

(51) Int. Cl.
*H04L 9/40* (2022.01)
(52) U.S. Cl.
CPC .............. *H04L 63/0853* (2013.01)
(58) Field of Classification Search
CPC .................................. H04L 63/0853
See application file for complete search history.

(56) References Cited

U.S. PATENT DOCUMENTS

| | | |
|---|---|---|
| 1,014,076 A | 1/1912 | Mcconnell |
| 8,843,057 B2 | 9/2014 | Atsmon et al. |
| 9,372,971 B2 | 6/2016 | Hammad |
| 9,419,951 B1 | 8/2016 | Felsher et al. |
| 9,519,901 B1 | 12/2016 | Dorogusker |
| 9,805,370 B1 | 10/2017 | Quigley et al. |
| 10,043,186 B2 | 8/2018 | Hammad et al. |
| 10,068,226 B2 | 9/2018 | Chandrasekaran |
| 10,102,521 B2 | 10/2018 | Fung et al. |
| 10,263,779 B2 | 4/2019 | Wu et al. |
| 10,366,378 B1 | 7/2019 | Han et al. |
| 10,387,871 B2 | 8/2019 | Hammad |
| 10,719,817 B2 * | 7/2020 | Just ..................... G06Q 20/321 |
| 10,769,602 B2 | 9/2020 | Kang |
| 10,810,557 B2 | 10/2020 | Solis |
| 10,949,858 B2 | 3/2021 | White et al. |
| 11,139,955 B1 | 10/2021 | So et al. |
| 11,288,280 B2 | 3/2022 | Padmanabhan et al. |
| 11,328,343 B1 * | 5/2022 | Chionna ............ G06Q 30/0271 |
| 11,551,200 B1 * | 1/2023 | Cook ................. G06Q 20/3226 |

(Continued)

*Primary Examiner* — Jeremy S Duffield

(57) ABSTRACT

An apparatus for using a validated card in a virtual environment comprises a processor associated with a server. The processor is configured to receive a request to conduct an interaction between a first avatar and an entity in a virtual environment. The processor is further configured to receive card information and device information from an unknown user device. The processor is further configured to verify that the unknown user device is a first user device. The processor is further configured to receive virtual session information that is associated with a virtual environment session. The processor is further configured to determine if the request to conduct the interaction occurred in the same virtual environment session as the reception of the card information. The processor is further configured to conduct the interaction between the first avatar and the entity with the received card information.

20 Claims, 3 Drawing Sheets

(56) References Cited

U.S. PATENT DOCUMENTS

| | | |
|---|---|---|
| 2009/0138807 A1* | 5/2009 | Fuhrmann .............. A63F 13/79 |
| | | 715/757 |
| 2015/0006403 A1 | 1/2015 | Shear et al. |
| 2015/0348018 A1 | 12/2015 | Campos et al. |
| 2016/0012465 A1 | 1/2016 | Sharp |
| 2016/0027008 A1 | 1/2016 | John |
| 2016/0335628 A1 | 11/2016 | Weigold |
| 2017/0046679 A1 | 2/2017 | Gotlieb et al. |
| 2017/0070527 A1* | 3/2017 | Bailey ................. G06F 21/316 |
| 2018/0005317 A1 | 1/2018 | Armstrong et al. |
| 2019/0370446 A1 | 12/2019 | Davis et al. |
| 2020/0167699 A1* | 5/2020 | Cohen ................... H04L 51/52 |
| 2020/0228524 A1* | 7/2020 | Szafranski .............. A63F 13/79 |
| 2021/0279721 A1 | 9/2021 | Campos |
| 2022/0253816 A1 | 8/2022 | Filter et al. |
| 2022/0270078 A1 | 8/2022 | Pomeroy et al. |
| 2022/0309369 A1 | 9/2022 | Chauhan et al. |
| 2022/0398560 A1* | 12/2022 | Moshyedi ........... G06Q 20/227 |
| 2023/0254152 A1* | 8/2023 | Ratnakaram .......... G06Q 20/30 |
| | | 726/7 |
| 2023/0273985 A1* | 8/2023 | Suchan ................ G06F 3/0482 |
| | | 726/18 |

* cited by examiner

SYSTEM AND METHOD FOR USING A VALIDATED CARD IN A VIRTUAL ENVIRONMENT

TECHNICAL FIELD

The present disclosure relates generally to network communications and information security. More particularly, in certain embodiments, the present disclosure is related to a system and method for using a validated card in a virtual environment.

BACKGROUND

In a network environment, user devices are in data communication with other user devices that may be distributed anywhere in the world. These network environments allow data and information to be shared among these devices. Some of the technical challenges that occur when data is exchanged between devices are controlling data leakage, unauthorized access to data, and preventing malicious activities. It is challenging to control unauthorized access to data in a virtual environment.

SUMMARY

The system and methods described in the present disclosure provide technical solutions to the technical problems discussed above by allowing a user to securely access a virtual environment and perform secure data interactions in the virtual environment. The disclosed system and methods provide several practical applications and technical advantages.

For example, the disclosed system and methods provide the practical application of improving interoperability of real-world systems and virtual world systems (e.g., metaverse systems) so that information may be seamlessly shared between these systems to implement data security, authorization of data interactions, access to virtual environments and other data interactions performed in real-world and virtual environments. For example, user information collected from the user and/or assigned to the user in a real-world environment may be used in a virtual environment (e.g., metaverse environment) to authenticate the user before allowing the user to access the virtual environment and perform any kind of action or interaction within the virtual environment.

Thus, the disclosed system and methods improve data security in the virtual environment. By improving data security in virtual environment, the disclosed system and methods generally improve technology related to performing secure data interactions in a virtual environment.

The system described in the present disclosure is particularly integrated into a practical application of improving the security of data transfer operations among entities and avatars in virtual environments. By improving the security of data transfer operations among entities in virtual environments, profiles of the entities and avatars, and data stored in the profiles are kept secured from unauthorized access. For example, if a bad actor impersonates a user and operates the user's avatar in a virtual environment to transfer data objects, virtual objects, services, etc. to themselves, the disclosed system is configured to detect that the bad actor is impersonating the user and deny the data transfer request from the bad actor. For verifying the identity of the user initiating a data transfer in a virtual environment, the disclosed system is configured to combine information received from the user (in the real-world) and information received from an avatar associated with the user (in the virtual environment). For example, the disclosed system is configured to validate card information received from the user in the real world by authenticating device information to correspond to a first user, avatar information to correspond to an avatar associated with the first user, and virtual environment session information.

In an embodiment, an apparatus for using a validated card in a virtual environment comprises a memory and a processor. The memory is operable to store first device information associated with a first user device, wherein the first user device is associated with a first user. The processor is operably coupled to the memory and configured to receive a request to conduct an interaction between a first avatar associated with the first user and an entity in a virtual environment. The processor is further configured to receive card information and second device information from an unknown user device. The processor is further configured to verify that the unknown user device is the first user device by determining that the second device information corresponds to the stored first device information associated with the first user device. The processor is further configured to receive virtual session information that is associated with a virtual environment session. The processor is further configured to determine if the request to conduct the interaction occurred in the same virtual environment session as the reception of the card information from the first user device. In response to determining that the request to conduct the interaction occurred in the same virtual environment session as the reception of the card information and the second device information, the processor is further configured to conduct the interaction between the first avatar and the entity with the received card information.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
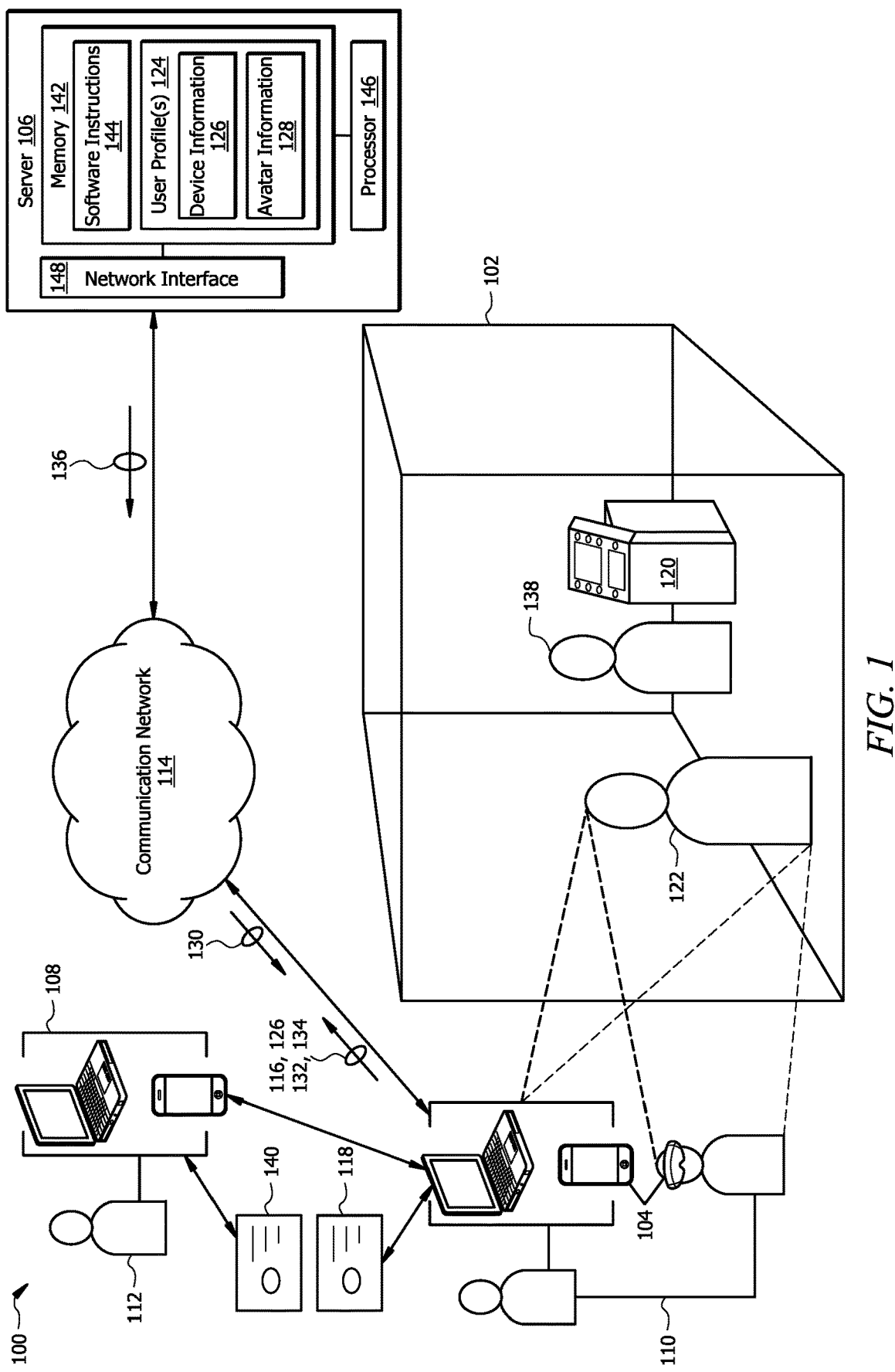
FIG. 1 is a schematic diagram of an example system for using a validated card in a virtual environment.
Figure 2:
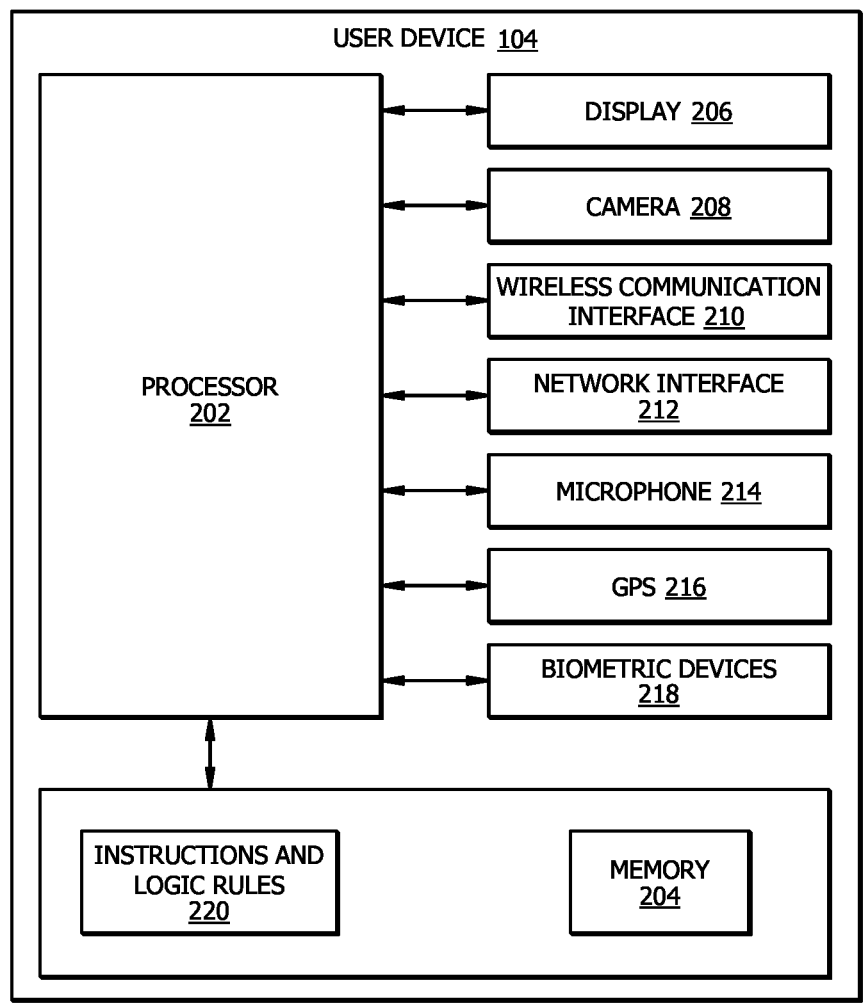
FIG. 2 is a block diagram of an example user device of the system of FIG. 1.
Figure 3:
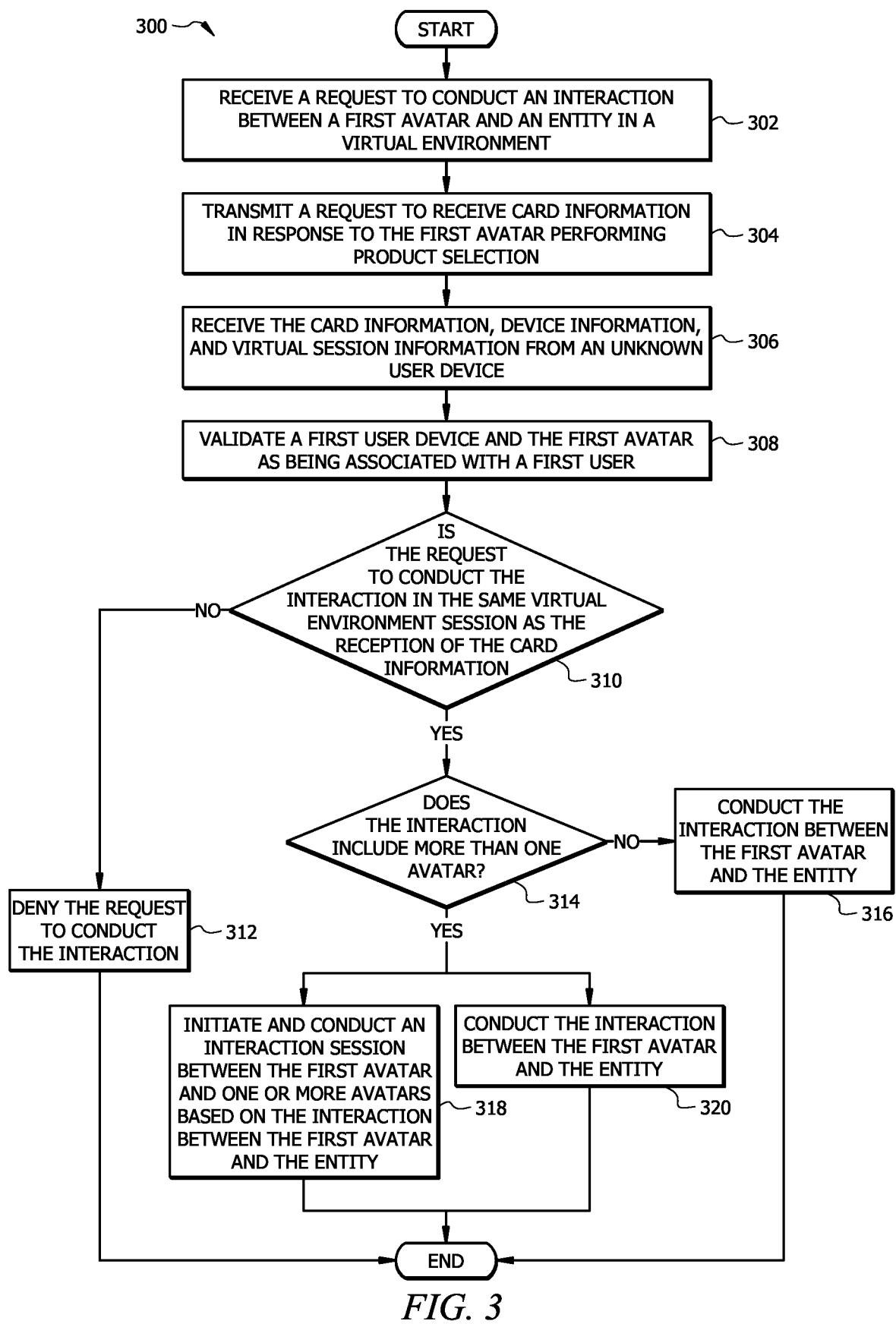
FIG. 3 is a flow diagram illustrating an example operation of the system of FIG. 1.

This disclosure provides solutions to the aforementioned and other problems of previous technology by using a validated card for an interaction in a virtual environment. FIG. 1 is a schematic diagram of an example system for using a validated card in a virtual environment. FIG. 2 is a block diagram of an example user device of the system of FIG. 1. FIG. 3 is a flow diagram illustrating an example operation of the system of FIG. 1.

Example System for Using a Validated Card

FIG. 1 illustrates a schematic diagram of an example system 100 that is generally configured to use a validated card for an interaction in a virtual environment 102. The system 100 may include a first user device 104, a server 106, and a second user device 108. A first user 110 is associated with the first user device 104, and a second user 112 is associated with the second user device 108. The system 100 may be communicatively coupled to a communication network 114 and may be operable to transmit data between the first user device 104, second user device 108, and the server 106 through the communication network 114. In general, the system 100 may improve electronic interaction technologies by uploading card information 116 from a physical card 118 associated with the first user 110 for use during an interaction between the first user 110 and an entity 120 in the virtual environment 102. This process provides improved information security because it validates that the card information 116 is not associated with a fraudulent user or entity prior to authorizing an interaction between the entity 120 and a first avatar 122 that is associated with the first user 110 in the virtual environment 102.

For example, in a particular embodiment, a user (for example, the first user 110) may attempt to interact with the entity 120 (such as a virtual kiosk) in the virtual environment 102. The entity 120 may be configured to provide virtual and/or real resources requested by the first user 110 during an interaction. The first user 110 may allow access to card information 116 associated with the first user 110 during the interaction with the entity 120 in exchange for the virtual and/or real resources provided by the entity 120. The card information 116 may correspond to and be provided by the physical card 118, wherein the first user 110 is in possession of the physical card 118 in a real-world environment. In embodiments, the real-world environment may be distinct and separate from the virtual environment 102. The first user 110 may upload the card information 116 from the physical card 118 to the virtual environment 102 for use during the interaction with the entity 120 and/or for subsequent interactions in the virtual environment 102.

In these examples, the entity 120 may not know if the card information 116 is associated with the first user 110. For example, a fraudulent user or bad actor may be attempting to interact with the entity 120 as the first user 110 for their own benefit through an improper acquisition of the physical card 118. To address this problem, the entity 120 may validate the card information 116 as corresponding to the first user 110 by authenticating data associated with the first avatar 122, the first user device 104, and virtual session information.

The first user 110 may access the virtual environment 102 through the first user device 104. The first user device 104 is configured to display a two-dimensional (2D) or three-dimensional (3D) representation of the virtual environment 102 to the first user 110. Examples of a virtual environment 102 may include, but are not limited to, a graphical or virtual representation of a metaverse, a map, a building interior, a landscape, a fictional location, an alternate reality, or any other suitable type of location or environment. The virtual environment 102 may be configured to use realistic or non-realistic physics for the motion of objects within the virtual environment 102. For example, some virtual environments 102 may be configured to use gravity whereas other virtual environments 102 may not be configured to use gravity. Within the virtual environment 102, each user may be associated with an avatar (such as the first avatar 122 for the first user 110). An avatar is a graphical representation of the user at a virtual location within the virtual environment 102. Examples of an avatar may include, but are not limited to, a person, an animal, or an object. In some embodiments, the features and characteristics of the avatar may be customizable and user-defined. For example, the size, shape, color, attire, accessories, or any other suitable type of appearance features may be specified by a user. In embodiments, the virtual location of the avatar may be correlated to a physical location of a user in the real-world environment. By using an avatar, a user is able to move within the virtual environment 102 to interact with another avatar and objects (such as entity 120) within the virtual environment 102 while independently remaining at the physical location or being in transit in the real-world environment.

In embodiments, the first user 110 may be required to sign into a secure portal to perform a registration procedure prior to engaging in a virtual environment session. After the registration procedure, the first user 110 may continue to sign into the secure portal to engage in the virtual environment 102 in any subsequent virtual environment session. In embodiments, a virtual environment session may be referred to as a period of activity by the first user 110 within the virtual environment 102. Each virtual environment session may be separate and distinct. The secure portal may provide access to the virtual environment 102 by employing single sign-on (SSO), multifactor authentication, or any other suitable authentication scheme in order to allow the first user 110 access to the virtual environment 102. Signing into the secure portal may allow access to a user profile 124 stored in the server 106, wherein the user profile 124 comprises user information associated with the real-world environment and the virtual environment 102. In embodiments, the registration procedure may comprise the first user 110 transmitting information to be stored as the user profile 124 in the server 106. The server 106 may store information related to the first user 110 in the user profile 124 including, but not limited to, user profile information, account information, digital assets, or any other suitable type of information that is associated with a user within any virtual environment 102 and/or the real-world environment. For example, the user profile 124 may store device information 126 associated with the first user device 104 and avatar information 128 associated with the first avatar 122. The server 106 may be configured to authenticate the first user 110 for an interaction using card information 116 based on the stored user profile 124 established during the registration procedure.

In general, the server 106 may improve interoperability of real-world systems and virtual world systems (e.g., metaverse systems) so that information may be seamlessly shared between these systems to implement data security, authorization of data interactions and other data interactions performed in real-world and virtual environments. For example, user information collected from the user and/or assigned to the user in a real-world environment may be leveraged in a virtual environment (e.g., virtual environment 102) to authenticate the first user 110 before allowing the first user 110 to perform any kind of action or interaction within the virtual environment 102. This process provides improved information security because it relies on real-world information associated with the first user 110 and virtual information to verify that provided card information 116 is associated with the first user 110.

While engaging in the virtual environment 102 via the first avatar 122, the first user 110 may attempt to interact with the entity 120. For example, the first user 110 may attempt to engage in an interaction session with the entity 120 through the first avatar 122 to exchange virtual resources and/or real-world resources. This interaction session may occur within any given virtual environment session in which the first user 110 is operating first avatar 122 in the virtual environment 102. Within the interaction, the first avatar 122 may select virtual and/or real resources through object selection. The entity 120 may receive data associated with the object selection and may transmit a request 130 to receive the card information 116 from the first user device 104. The first user device 104 may receive and display the request 130 to the first user 110. The first user 110 may then bring the physical card 118 within physical proximity to the first user device 104. A communication link may be established between the physical card 118 and the first user device 104 thereby allowing communications between each other. Without limitations, any suitable communication link may be used, such as near field communications protocols. Once communicatively coupled, the first user device 104 may receive the card information 116 from the physical card 118 that corresponds to the physical card 118. In embodiments, the card information 116 may include a card number, expiration date, user identity, security code, and the like.

The first user device 104 may be configured to assign the received card information 116 to the first avatar 122 during the virtual environment session. In embodiments, the card information 116 may be displayed to the first user 110 during that virtual environment session. In embodiments, the card information 116 may not be available in a subsequent virtual environment session. For example, if the first user 110 signs out or logs off to disengage from the virtual environment 102, that virtual environment session may terminate. When the first user 110 signs back in to engage in the virtual environment 102, a new virtual environment session may be started. The uploaded card information 116 may be available for use in the virtual environment 102 within the same virtual environment session in which it was uploaded. The card information 116 may be displayed through a user interface corresponding to interactions with the first avatar 122. Alternatively, the card information 116 may be displayed as a non-fungible token, wherein the non-fungible token may be generated to have the same visual appearance as the physical card 118 in the real-world environment.

During the interaction between the first avatar 122 and the entity 120, the entity 120 may further receive device information 126 and virtual session information 132 from the first user device 104. The received device information 126 and virtual session information 132, which may be metadata associated with a virtual environment session, may be used by the server 106 to authenticate that the first user 110 is indeed party to the interaction via the first avatar 122. In embodiments, the server 106 may not be aware of which user and/or user device is operating a given avatar in the virtual environment 102. To determine the identity of a user, the server 106 may analyze the stored user profiles 124 established during the registration procedure. The server 106 may then validate that the provided card information 116 is associated to the first user 110 by authenticating the device information 126, avatar information 128, and virtual session information 132 prior to conducting the interaction.

In embodiments, the server 106 may receive a request 134 from the first user device 104 to establish an interaction session between the first avatar 122 and the entity 120. The server 106 may further receive the card information 116, the device information received by the entity 120, the virtual session information 132, and unidentified avatar information. In certain embodiments, the server 106 may be configured to operate as the entity 120 and may receive the card information 116, the device information received by the entity 120, the virtual session information 132, and unidentified avatar information directly from the first user device 104. In other embodiments, the entity 120 may transmit the card information 116, the device information received by the entity 120, the virtual session information 132, and unidentified avatar information to the server 106 for processing.

In embodiments, the identity of the avatar requesting the interaction and/or the identity of the user device used to operate that avatar may be unknown to the server 106. To proceed with conducting the interaction using the card information 116 that is associated with the first user 110, the server 106 may first determine that the interaction is between the first avatar 122 and the entity 120, wherein the first user device 104 is operating the first avatar 122. The first user 110 may be required to have previously approved usage of the card information 116 with the first avatar 122 and first user device 104. Approval may be conveyed through the initial registration procedure.

To determine the identity of the unknown user device, the server 106 may compare the device information provided by the unknown user device to the device information 126 stored in each user profile 124. The server 106 may verify that the unknown device is the first user device 104 by determining that the received, unknown device information corresponds to the stored device information 126 associated with the first user device 104. The server 106 may further not know the identity of the avatar requesting the interaction with the entity 120. To determine the identity of the unknown avatar, the server 106 may compare the provided avatar information provided to the avatar information 128 stored in each user profile 124. The server 106 may verify that the unknown avatar is the first avatar 122 by determining that the received, unknown avatar information corresponds to the stored avatar information 128 associated with the first user 110.

Upon confirmation of both the unknown user device being the first user device 104 and the unknown avatar being the first avatar 122, the server 106 may further determine if the request to conduct the interaction occurred in the same virtual environment session as the reception of the card information 116 from the first user device 104. For example, the interaction may not proceed if the first user 110 logged off or signed off during the interaction session between the first avatar 122 and the entity 120 occurring within a first virtual environment session and logs back into the virtual environment 102 in a second virtual environment session. The metadata associated with each virtual environment session may be different, which may affect the completion of an interaction with the entity 120.

For example, in the first virtual environment session, the entity 120 may be operable to provide five virtual and/or real resources, and the first user 110 may select one of the five during object selection in the interaction session. If the first user 110 logs off and then enters the second virtual environment session, the entity 120 may be operable to provide three of the previous five virtual and/or real resources. The interaction would not be capable of completion if the first user 110 had initially selected one of the virtual and/or real resources that is not available during the second virtual environment session. If there is a determination that the request to conduct the interaction occurred in the same virtual environment session as the reception of the card information 116 from the first user device 104, the server 106 may proceed with conducting the interaction. The server 106 may further transmit a notification 136 to the first user device 104 indicating confirmation of the interaction between the first avatar 122 and the entity 120.

The server 106 may further determine whether the interaction between the first avatar 122 and the entity 120 includes a second avatar 138 associated with the second user 112. If there is a determination that the interaction does not include the second avatar 138, or any subsequent number of avatars, the server 106 may proceed with conducting the interaction. Otherwise, the server 106 may be configured to initiate and conduct an interaction session between the first avatar 122 and the second avatar 138 based on the request to conduct the interaction between the first avatar 122 and the entity 120. In embodiments, the interaction session between the first avatar 122 and second avatar 138 may be different and separate from the interaction session between the first avatar 122 and the entity 120, wherein the interaction session between the first avatar 122 and the second avatar 138 may occur concurrently with or after the interaction session between the first avatar 122 and the entity 120.

In an example, the second avatar 138 may not be capable of interacting with the entity 120 for lack of virtual resources and/or real-world resources to exchange for the provided good and/or services of the entity 120. In this example, the first avatar 122 may interact with the entity 120 on behalf of the second avatar 138. The server 106 may conduct the interaction between the first avatar 122 and the entity 120 and then facilitate transmission from the first avatar 122 to the second avatar 138.

In another example, the first avatar 122 may split the interaction with the entity 120 between the second avatar 138 and/or one or more other avatars. In this example, the second avatar 138 may be prompted to provide card information 116 associated with a second physical card 140 that belongs to the second user 112. The second user 112 may receive the prompt through the second user device 108, and the second user device 108 may display the prompt to provide card information 116 associated with the second physical card 140. The second user 112 may then bring the second physical card 140 within physical proximity to the second user device 108. A communication link may be established between the second physical card 140 and the second user device 108 thereby allowing communications between each other. Once communicatively coupled, the second user device 108 may receive the card information 116 from the second physical card 140 that corresponds to the second physical card 140. The server 106 may receive the card information 116 corresponding to the second physical card 140 from the second user device 108 and may further receive card information 116 from any other avatars included in the interaction session between the first avatar 122 and the second avatar 138 in a similar manner. The server 106 may then conduct a split interaction between the first avatar 122 and at least the second avatar 138 in relation to the interaction session between the first avatar 122 and the entity 120. For example, the server 106 may facilitate interactions between each party through the first avatar 122 as the first avatar 122 is party to each both the interaction with the entity 120 and the split interaction with at least the second avatar 138. Upon completing the split interaction between the first avatar 122 and at least the second avatar 138, the server 106 may conduct the interaction between the first avatar 122 and the entity 120. The server 106 may then then facilitate transmission from the first avatar 122 to the second avatar 138 of any virtual and/or real resources received in view of the split interaction.

The server 106 is generally a suitable server (e.g., including a physical server and/or virtual server) operable to store data in a memory 142 and/or provide access to application(s) or other services. The server 106 may be a backend server associated with a particular group that facilitates conducting interactions between entities and one or more users. Details of the operations of the server 106 are described in conjunction with FIG. 3. Memory 142 includes software instructions 144 that, when executed by a processor 146, cause the server 106 to perform one or more functions described herein. Memory 142 may be volatile or non-volatile and may comprise a read-only memory (ROM), random-access memory (RAM), ternary content-addressable memory (TCAM), dynamic random-access memory (DRAM), and static random-access memory (SRAM). Memory 142 may be implemented using one or more disks, tape drives, solid-state drives, and/or the like. Memory 142 is operable to store software instructions 144, user profiles 124, and/or any other data or instructions. The software instructions 144 may comprise any suitable set of instructions, logic, rules, or code operable to execute the processor 146. In these examples, the processor 146 may be communicatively coupled to the memory 142 and may access the memory 142 for these determinations.

Processor 146 comprises one or more processors operably coupled to the memory 142. The processor 146 is any electronic circuitry including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 146 can include any suitable data generation engine modules. The processor 146 may be a programmable logic device, a microcontroller, a microprocessor, or any suitable combination of the preceding. The one or more processors are configured to process data and may be implemented in hardware or software. For example, the processor 146 may be 8-bit, 16-bit, 32-bit, 64-bit, or of any other suitable architecture. The processor 146 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute software instructions 144. In this way, processor 146 may be a special-purpose computer designed to implement the functions disclosed herein. In an embodiment, the processor 146 is implemented using logic units, FPGAs, ASICs, DSPs, or any other suitable hardware. The processor 146 is configured to operate as described in FIGS. 1 and 3. For example, the processor 146 may be configured to perform the steps of method 300 as described in FIG. 3.

As illustrated, the server 106 may further comprise a network interface 148. Network interface 148 is configured to enable wired and/or wireless communications (e.g., via communication network 114). The network interface 148 is configured to communicate data between the server 106 and other devices (e.g., first user device 104, second user device 108, etc.), databases, systems, or domain(s). For example, the network interface 148 may comprise a WIFI interface, a local area network (LAN) interface, a wide area network (WAN) interface, a modem, a switch, or a router. The processor 146 is configured to send and receive data using the network interface 148. The network interface 148 may be configured to use any suitable type of communication protocol as would be appreciated by one of skill in the art.

The communication network 114 may facilitate communication within the system 100. This disclosure contemplates the communication network 114 being any suitable network operable to facilitate communication between the first user device 104, second user device 108, and the server 106. Communication network 114 may include any interconnecting system capable of transmitting audio, video, signals, data, messages, or any combination of the preceding. Communication network 114 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a POT network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication network, a Zigbee network, and/or any other suitable network, operable to facilitate communication between the components of system 100. In other embodiments, system 100 may not have all of these components and/or may have other elements instead of, or in addition to, those above.

Entity 120 may be present at different locations in the virtual environment 102. For example, an entity 120 may be a virtual representation of a physical entity in the virtual environment 102. For example, an entity 102 may be a virtual store, a virtual office, and the like. Likewise, a physical entity may be a physical store, a physical office, and the like associated with the same virtual entity. The entity 120 may provide virtual objects and/or services (e.g., resources and data objects) to avatars and users (i.e., first avatar 122 and first user 110). When the user receives a virtual object and/or a service from the entity 120, it may reflect in the real world. Further, the user may want to transfer data objects to the virtual entity 120, and this may reflect in the real world as well. For example, when a data object is transferred from the user (e.g., from the first avatar 122) to the entity 120, the data object (or an equivalent representation of the data object) may be transferred to the respective physical entity (e.g., to a database associated with physical entity).

The first user device 104 and/or second user device 108 may be any computing device configured to communicate with other devices, such as a server (e.g., server 106), databases, etc. through the communication network 114. The first user device 104 may be configured to perform specific functions described herein and interact with server 106, e.g., via its user interfaces. The first user device 104 is a hardware device that is generally configured to provide hardware and software resources to a user. Examples of a user device include, but are not limited to, a virtual reality device, an augmented reality device, a laptop, a computer, a smartphone, a tablet, a smart device, an Internet-of-Things (IoT) device, or any other suitable type of device. The user device may comprise a graphical user interface (e.g., a display), a touchscreen, a touchpad, keys, buttons, a mouse, or any other suitable type of hardware that allows a user to view data and/or to provide inputs into the user device. The first user device 104 may be configured to allow a user to send requests to the server 106 or to another user device.

Example User Device

FIG. 2 is a block diagram of an embodiment of the first user device 104 used by the system of FIG. 1. While FIG. 2 provides an example of the components of first user device 104, similar underlying components may also apply to the second user device 108. First user device 104 may be configured to display the virtual environment 102 (referring to FIG. 1) within a field of view of the first user 110 (referring to FIG. 1), capture biometric, sensory, and/or physical information of the first user 110 wearing the first user device 104, and to facilitate an electronic interaction between the first user 110 and the entity 120 (referring to FIG. 1). An example of the first user device 104 in operation is described in FIG. 3.

First user device 104 comprises a processor 202, a memory 204, and a display 206. Further embodiments may include a camera 208, a wireless communication interface 210, a network interface 212, a microphone 214, a global position system (GPS) sensor 216, and/or one or more biometric devices 218. First user device 104 may be configured as shown or in any other suitable configuration. For example, first user device 104 may comprise one or more additional components and/or one or more shown components may be omitted.

The processor 202 comprises one or more processors operably coupled to and in signal communication with memory 204, display 206, camera 208, wireless communication interface 210, network interface 212, microphone 214, GPS sensor 216, and biometric devices 218. Processor 202 is configured to receive and transmit electrical signals among one or more of memory 204, display 206, camera 208, wireless communication interface 210, network interface 212, microphone 214, GPS sensor 216, and biometric devices 218. The electrical signals are used to send and receive data (e.g., images captured from camera 208, virtual objects to display on display 206, etc.) and/or to control or communicate with other devices. Processor 202 may be operably coupled to one or more other devices (for example, the server 106 in FIG. 1). In embodiments, the processor 202 may utilize any suitable deep learning algorithm and/or protocols, machine learning algorithms, and the like.

The processor 202 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement the function disclosed herein, such as some or all of those described with respect to FIGS. 1 and 5. For example, processor 202 may be configured to display virtual objects on display 206, detect hand gestures, identify virtual objects selected by a detected hand gesture (e.g., identify selected files), capture biometric information of a user, such as first user 110, via one or more of camera 208, microphone 214, and/or biometric devices 218, and communicate via wireless communication interface 210 with server 106. In some embodiments, the function described herein is implemented using logic units, FPGAs, ASICs, DSPs, or any other suitable hardware or electronic circuitry.

The memory 204 is operable to store any of the information described with respect to FIGS. 1 and 3 along with any other data, instructions, logic, rules, or code operable to implement the function(s) described herein when executed by processor 202. For example, the memory 204 may store the instructions and logic rules 220, which are described below with respect to FIG. 3. The memory 204 comprises one or more disks, tape drives, or solid-state drives, and may be used as an over-flow data storage device, to store programs when such programs are selected for execution, and to store instructions and data that are read during program execution. Memory 204 is operable to store, for example, instructions for performing the functions of first user device 104 described herein, and any other data or instructions. The memory 204 may be volatile or non-volatile and may comprise read-only memory (ROM), random-access memory (RAM), ternary content-addressable memory (TCAM), dynamic random-access memory (DRAM), and static random-access memory (SRAM).

Display 206 is configured to present visual information to a user (for example, first user 110 in FIG. 1) in an augmented reality environment that overlays virtual or graphical objects onto tangible objects in a real scene in real-time. In other embodiments, the display 206 is configured to present visual information to the user as the virtual environment 102 (referring to FIG. 1) in real-time. In an embodiment, display 206 is a wearable optical display (e.g., glasses or a headset) configured to reflect projected images and enables a user to see through the display. For example, display 206 may comprise display units, lens, semi-transparent mirrors embedded in an eye glass structure, a visor structure, or a helmet structure. Examples of display units include, but are not limited to, a cathode ray tube (CRT) display, a liquid crystal display (LCD), a liquid crystal on silicon (LCOS) display, a light emitting diode (LED) display, an active matrix OLED (AMOLED), an organic LED (OLED) display, a projector display, or any other suitable type of display as would be appreciated by one of ordinary skill in the art upon viewing this disclosure. In another embodiment, display 206 is a graphical display on a user device. For example, the graphical display may be the display of a tablet or smart phone configured to display an augmented reality environment with virtual or graphical objects onto tangible objects in a real scene in real-time and/or virtual environment 102.

Examples of camera 208 include, but are not limited to, charge-coupled device (CCD) cameras and complementary metal-oxide semiconductor (CMOS) cameras. Camera 208 is configured to capture images of a wearer of first user device 104, such as first user 110. Camera 208 may be configured to capture images continuously, at predetermined intervals, or on-demand. For example, camera 208 may be configured to receive a command from first user 110 to capture an image. In another example, camera 208 is configured to continuously capture images to form a video stream. Camera 208 is communicably coupled to processor 202.

Examples of wireless communication interface 210 include, but are not limited to, a Bluetooth interface, an RFID interface, a near field communication interface, a local area network (LAN) interface, a personal area network interface, a wide area network (WAN) interface, a Wi-Fi interface, a ZigBee interface, or any other suitable wireless communication interface as would be appreciated by one of ordinary skill in the art upon viewing this disclosure. Wireless communication interface 210 is configured to facilitate processor 202 in communicating with other devices. For example, wireless communication interface 210 is configured to enable processor 202 to send and receive signals with other devices, such as server 106 (referring to FIG. 1). Wireless communication interface 210 is configured to employ any suitable communication protocol.

The network interface 212 is configured to enable wired and/or wireless communications. The network interface 212 is configured to communicate data between the first user device 104 and other network devices, systems, or domain(s). For example, the network interface 212 may comprise a WIFI interface, a local area network (LAN) interface, a wide area network (WAN) interface, a modem, a switch, or a router. The processor 202 is configured to send and receive data using the network interface 212. The network interface 212 may be configured to use any suitable type of communication protocol as would be appreciated by one of ordinary skill in the art.

Microphone 214 is configured to capture audio signals (e.g., voice signals or commands) from a user, such as first user 110. Microphone 214 is configured to capture audio signals continuously, at predetermined intervals, or on-demand. Microphone 214 is communicably coupled to processor 202.

GPS sensor 216 is configured to capture and to provide geographical location information. For example, GPS sensor 216 is configured to provide a geographic location of a user, such as first user 110, employing first user device 104. GPS sensor 216 may be configured to provide the geographic location information as a relative geographic location or an absolute geographic location. GPS sensor 216 may provide the geographic location information using geographic coordinates (i.e., longitude and latitude) or any other suitable coordinate system. GPS sensor 216 is communicably coupled to processor 202.

Examples of biometric devices 218 may include, but are not limited to, retina scanners and fingerprint scanners. Biometric devices 218 are configured to capture information about a person's physical characteristics and to output a biometric signal based on captured information. A biometric signal is a signal that is uniquely linked to a person based on their physical characteristics. For example, biometric device 218 may be configured to perform a retinal scan of the user's eye and to generate a biometric signal for the user based on the retinal scan. As another example, a biometric device 218 is configured to perform a fingerprint scan of the user's finger and to generate a biometric signal for the user based on the fingerprint scan. Biometric device 218 is communicably coupled to processor 202.

Example Operation of the System for Using a Validated Card in an Interaction

FIG. 3 is a flow diagram illustrating an example method 300 of the system 100 of FIG. 1. The method 300 may be implemented using the first user device 104 and the server 106 of FIG. 1. The method 300 may begin at operation 302 where the processor 146 (referring to FIG. 1) of the server 106 may receive the request 134 (referring to FIG. 1) to establish an interaction session between the first avatar 122 (referring to FIG. 1) and the entity 120 (referring to FIG. 1). The processor 146 of the server 106 may establish the interaction session, wherein the first avatar 122 and entity 120 may communicate with each other. During the interaction session, the entity 120 may receive user input during object selection of virtual and/or real resources from the first avatar 122.

At operation 304, in response to the first avatar 122 performing object selection with the entity 120, the processor 146 of server 106 may transmit a request 130 (referring to FIG. 1) to receive the card information 116 (referring to FIG. 1). In embodiments, the server 106 may directly transmit the request 130, or the processor 146 may instruct the entity 120 to transmit the request 130. The first user device 104 associated with the first user 110 (referring to FIG. 1) and controlling the first avatar 122 may receive the request 130 and may proceed to upload the card information 116 to the virtual environment 102. For example, the first user 110 may bring the physical card 118 (referring to FIG. 1) that is associated with the first user 110 within physical proximity to the first user device 104. A communication link may be established between the physical card 118 and the first user device 104 thereby allowing communications between each other. Once communicatively coupled, the first user device 104 may receive the card information 116 from the physical card 118 that corresponds to the physical card 118. The first user device 104 may then assign the received card information 116 to the first avatar 122 to be used in the interaction.

At operation 306, the processor 146 of server 106 may receive the card information 116, unknown device information, and virtual session information 132. The server 106 may be configured for reception directly from a user device and/or from the entity 102 (for example, the entity 120 or a user device may provide the card information 116, unknown device information, and virtual session information 132). In embodiments, the identity of the avatar (i.e., first avatar 122) requesting the interaction and/or the identity of the user device (i.e., first user device 104) used to operate that avatar may be unknown to the server 106. To proceed with conducting the interaction using the card information 116 that is associated with the first user 110, the server 106 may first determine that the interaction is between the first avatar 122 and the entity 120, wherein the first user device 104 is operating the first avatar 122. The first user 110 may be required to have previously approved usage of the card information 116 with the first avatar 122 and first user device 104, where approval may be conveyed through the initial registration procedure.

At operation 308, the processor 146 of server 106 may verify that the unknown user device is the first user device 104. To determine the identity of the unknown user device, the server 106 may compare the device information provided by the unknown user device to the device information 126 stored in each user profile 124 (referring to FIG. 1), where the user profiles 124 are stored in the memory 142 (referring to FIG. 1) of server 106. The server 106 may verify that the unknown device is the first user device 104 by determining that the received, unknown device information corresponds to the stored device information 126 associated with the first user device 104. The server 106 may further not know the identity of the avatar requesting the interaction with the entity 120. To determine the identity of the unknown avatar, the server 106 may compare the provided avatar information provided to the avatar information 128 (referring to FIG. 1) stored in each user profile 124. The server 106 may verify that the unknown avatar is the first avatar 122 by determining that the received, unknown avatar information corresponds to the stored avatar information 128 associated with the first user 110.

At operation 310, upon confirmation of both the unknown user device being the first user device 104 and the unknown avatar being the first avatar 122, the processor 146 of server 106 may further determine if the request to conduct the interaction occurred in the same virtual environment session as the reception of the card information 116 from the first user device 104. If the processor 146 determines that the request 134 to conduct the interaction did not occur in the same virtual environment session as the reception of the card information 116 from the first user device 104, the method 300 proceeds to operation 312. Otherwise, the method 300 proceeds to operation 314.

At operation 312, the processor 146 of server 106 may deny the interaction between the first avatar 122 and the entity 120 and terminate the interaction session. The method 300 proceeds to end.

At operation 314, the processor 146 of server 106 may further determine if the interaction between the first avatar 122 and the entity 120 includes the second avatar 138 (referring to FIG. 1) associated with the second user 112 (referring to FIG. 1). If there is a determination that the interaction does not include the second avatar 138, or any subsequent number of avatars, method 300 proceeds to operation 316. Otherwise, the method 300 proceeds to operation 318 and operation 320.

At operation 316, in response to a determination that there are no other avatars included in the interaction between the first avatar 122 and the entity 120, the processor 146 of the server 106 may conduct the interaction, wherein the interaction comprises exchanging virtual resources and/or real-world resources for virtual and/or real resources provided by entity 120. In embodiments, the virtual resources and/or real-world resources may be provided by the first user 110 through the card information 116 corresponding to physical card 118. Then, the method 300 proceeds to end.

At operation 318 and operation 320, in response to a determination that there are other avatars included in the interaction between the first avatar 122 and the entity 120 (such as second avatar 138), the processor 146 of the server 106 may initiate and conduct an interaction session between the first avatar 122 and the second avatar 138 and may conduct the interaction between the first avatar 122 and entity 120. In embodiments, the interaction session between the first avatar 122 and second avatar 138 may be different and separate from the interaction session between the first avatar 122 and the entity 120, wherein the interaction session between the first avatar 122 and the second avatar 138 may occur concurrently with or after the interaction session between the first avatar 122 and the entity 120.

In an example, the second avatar 138 may not be capable of interacting with the entity 120 for lack of virtual resources and/or real-world resources to exchange for the provided good and/or services of the entity 120. In this example, the first avatar 122 may interact with the entity 120 on behalf of the second avatar 138. The server 106 may conduct the interaction between the first avatar 122 and the entity 120 and then facilitate transmission from the first avatar 122 to the second avatar 138. In this example, the interaction session between the first avatar 122 and second avatar 138 may be completed after the interaction between the first avatar 122 and entity 120.

In another example, the first avatar 122 may split the interaction with the entity 120 between the second avatar 138 and/or one or more other avatars. In this example, the second avatar 138 may be prompted to provide card information 116 associated with a second physical card 140 (referring to FIG. 1) that belongs to the second user 112 (referring to FIG. 1). Similar to operation 304, the second user 112 may receive the prompt through the second user device 108 (referring to FIG. 1), and the second user device 108 may display the prompt to provide card information 116 associated with the second physical card 140. The second user 112 may then bring the second physical card 140 within physical proximity to the second user device 108. A communication link may be established between the second physical card 140 and the second user device 108 thereby allowing communications between each other. Once communicatively coupled, the second user device 108 may receive the card information 116 from the second physical card 140 that corresponds to the second physical card 140. The server 106 may receive the card information 116 corresponding to the second physical card 140 from the second user device 108 and may further receive card information 116 from any other avatars included in the interaction session between the first avatar 122 and the second avatar 138 in a similar manner. The server 106 may then conduct a split interaction between the first avatar 122 and at least the second avatar 138 in view of the interaction session between the first avatar 122 and the entity 120. For example, the server 106 may facilitate interactions between each party through the first avatar 122 as the first avatar 122 is party to both the interaction with the entity 120 and the split interaction with at least the second avatar 138. Upon completing the split interaction between the first avatar 122 and at least the second avatar 138, the server 106 may conduct the interaction between the first avatar 122 and the entity 120. The server 106 may then facilitate transmission from the first avatar 122 to the second avatar 138 of any virtual and/or real resources received in view of the split interaction. Then, the method 300 proceeds to end.

While several embodiments have been provided in the present disclosure, it should be understood that the disclosed systems and methods might be embodied in many other specific forms without departing from the spirit or scope of the present disclosure. The present examples are to be considered as illustrative and not limiting, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 106(f) as it exists on the date of filing hereof unless the words "means for" or "step for" are explicitly used in the particular claim.

The invention claimed is:

1. An apparatus for using a validated card in a virtual environment, comprising:
  a memory operable to:
    store first device information associated with a first user device, wherein the first user device is associated with a first user; and
  a processor, operably coupled to the memory, configured to:
    receive a request to conduct an interaction between a first avatar associated with the first user and an entity in the virtual environment, wherein the request is to receive a virtual resource from the entity;
    receive card information and second user device information from an unknown user device;
    verify that the unknown user device is the first user device by determining that the second user device information corresponds to the stored first device information associated with the first user device;
    receive virtual session information that is associated with a virtual environment session;
    determine if the request to conduct the interaction occurred in the same virtual environment session as the reception of the card information from the first user device; and
    in response to determining that the request to conduct the interaction occurred in the same virtual environment session as the reception of the card information and the second device information, determine if the interaction between the entity and the first avatar includes a second avatar associated with a second user of a third user device;
    initiate an interaction session between the first avatar and the second avatar, in response to determining that the interaction between the entity and the first avatar includes a second avatar, wherein the interaction session between the first avatar and the second avatar occurs concurrently with the virtual environment session between the first avatar and the entity;
    transmit an indication to the third user device associated with the second avatar, in response to an indication from the first avatar to split the interaction with the second avatar;
    receive another card information from the third user device;
    initiate splitting the interaction between the first avatar and the second avatar, in response to receiving the card information from the third user device;
    conduct the interaction between the first avatar and the entity and transmit the virtual resource to the first avatar in the virtual environment, upon completion of the splitting of the interaction between the first avatar and the second avatar; and
    facilitate transmission of the virtual resource from the first avatar to the second avatar.

2. The apparatus of claim 1, wherein the processor is further configured to:
  instruct the first user device to display the received card information for a subsequent interaction occurring within the same virtual environment session.

3. The apparatus of claim 1, wherein the card information is uploaded to the first user device through a communication link established between the first user device and a card.

4. The apparatus of claim 3, wherein the communication link is established using near field communications protocols to transmit the card information to the first user device.

5. The apparatus of claim 1, wherein the processor is further configured to:
  transmit a notification to the first user device indicating confirmation of the interaction between the first avatar and the entity.

6. The apparatus of claim 1, wherein the processor is further configured to:
  transmit a request to receive the card information in response to the first avatar performing object selection with the entity.

7. The apparatus of claim 1, wherein the interaction session between the first avatar and the second avatar is separate from the virtual environment session between the first avatar and the entity and the second avatar cannot interact with the entity because of lack of virtual resources to exchange with the entity.

8. A method for using a validated card in a virtual environment, comprising:
receiving a request to conduct an interaction between a first avatar associated with a first user and an entity in the virtual environment, wherein the request is to receive a virtual resource from the entity;
receiving card information and second user device information from an unknown user device;
verifying that the unknown user device is a first user device associated with the first user by determining that the received second user device information corresponds to a first device information associated with the first user device;
receiving virtual session information that is associated with a virtual environment session;
determining if the request to conduct the interaction occurred in the same virtual environment session as the reception of the card information from the first user device; and
in response to determining that the request to conduct the interaction occurred in the same virtual environment session as the reception of the card information and the device information determining if the interaction between the entity and the first avatar includes a second avatar associated with a second user of a third user device;
initiating an interaction session between the first avatar and the second avatar, in response to determining that the interaction between the entity and the first avatar includes a second avatar, wherein the interaction session between the first avatar and the second avatar occurs concurrently with the virtual environment session between the first avatar and the entity;
transmitting an indication to the third user device associated with the second avatar, in response to an indication from the first avatar to split the interaction with the second avatar;
receiving another card information from the third user device;
initiating splitting the interaction between the first avatar and the second avatar, in response to receiving the card information from the third user device;
conducting the interaction between the first avatar and the entity and transmit the virtual resource to the first avatar in the virtual environment, upon completion of the splitting of the interaction between the first avatar and the second avatar; and
facilitating transmission of the virtual resource from the first avatar to the second avatar.

9. The method of claim 8, further comprising instructing the first user device to display the received card information for a subsequent interaction occurring within the same virtual environment session.

10. The method of claim 8, wherein the card information is uploaded to the first user device through a communication link established between the first user device and a card.

11. The method of claim 10, wherein the communication link is established using near field communications protocols to transmit the card information to the first user device.

12. The method of claim 8, further comprising transmitting a notification to the first user device indicating confirmation of the interaction between the first avatar and the entity.

13. The method of claim 8, further comprising transmitting a request to receive the card information in response to the first avatar performing object selection with the entity.

14. The method of claim 8, wherein the interaction session between the first avatar and the second avatar is separate from the virtual environment session between the first avatar and the entity and the second avatar cannot interact with the entity because of lack of virtual resources to exchange with the entity.

15. A non-transitory computer-readable medium comprising instructions that are configured, when executed by a processor, to:
receive a request to conduct an interaction between a first avatar associated with a first user and an entity in a virtual environment, wherein the request is to receive a virtual resource from the entity;
receive card information and second user device information from an unknown user device;
verify that the unknown user device is a first user device associated with the first user by determining that the received second user device information corresponds to a first device information associated with the first user device;
receive virtual session information that is associated with a virtual environment session;
determine if the request to conduct the interaction occurred in the same virtual environment session as the reception of the card information from the first user device; and
in response to determining that the request to conduct the interaction occurred in the same virtual environment session as the reception of the card information and the device information
determine if the interaction between the entity and the first avatar includes a second avatar associated with a second user of a third user device;
initiate an interaction session between the first avatar and the second avatar, in response to determining that the interaction between the entity and the first avatar includes a second avatar, wherein the interaction session between the first avatar and the second avatar occurs concurrently with the virtual environment session between the first avatar and the entity;
transmit an indication to the third user device associated with the second avatar, in response to an indication from the first avatar to split the interaction with the second avatar;
receive another card information from the third user device;
initiate splitting the interaction between the first avatar and the second avatar, in response to receiving the card information from the third user device;
conduct the interaction between the first avatar and the entity and transmit the virtual resource to the first avatar in the virtual environment, upon completion of the splitting of the interaction between the first avatar and the second avatar; and
facilitate transmission of the virtual resource from the first avatar to the second avatar.

16. The non-transitory computer-readable medium of claim 15, wherein the instructions are further configured to:
instruct the first user device to display the received card information for a subsequent interaction occurring within the same virtual environment session.

17. The non-transitory computer-readable medium of claim 15, wherein the card information is uploaded to the first user device through a communication link established between the first user device and a card, wherein the communication link is established using near field communications protocols to transmit the card information to the first user device.

18. The non-transitory computer-readable medium of claim 15, wherein the instructions are further configured to:
    transmit a notification to the first user device indicating confirmation of the interaction between the first avatar and the entity.

19. The non-transitory computer-readable medium of claim 15, wherein the instructions are further configured to:
    transmit a request to receive the card information in response to the first avatar performing object selection with the entity.

20. The non-transitory computer-readable medium of claim 15, wherein the
    interaction session between the first avatar and the second avatar is separate from the virtual environment session between the first avatar and the entity and the second avatar cannot interact with the entity because of lack of virtual resources to exchange with the entity.

* * * * *